(12) United States Patent
Clayton

(10) Patent No.: US 6,302,449 B1
(45) Date of Patent: Oct. 16, 2001

(54) SEALING RING/SEALING NUT

(75) Inventor: Matthew W. Clayton, Houston, PA (US)

(73) Assignee: Matthew Clayton, Houston, PA (US)

( * ) Notice: Subject to any disclaimer, the term of this patent is extended or adjusted under 35 U.S.C. 154(b) by 0 days.

(21) Appl. No.: 09/412,723

(22) Filed: Oct. 5, 1999

(51) Int. Cl.⁷ .................................................... F16L 5/00
(52) U.S. Cl. ........................ 285/192; 285/343; 52/220.08
(58) Field of Search ................................. 285/192, 342, 285/343; 52/302.1, 302.7, 302.5, 302.3, 220.8

(56) References Cited

U.S. PATENT DOCUMENTS

| | | | |
|---|---|---|---|
| 1,391,396 | * 9/1921 | McMurtrie | 285/192 |
| 2,450,883 | * 10/1948 | D'Amico | 285/192 |
| 2,733,939 | * 2/1956 | Scherer | 285/192 |
| 3,989,283 | 11/1976 | Pepper . | |
| 4,427,219 | 1/1984 | Madej . | |
| 4,699,177 | 10/1987 | Thomas . | |
| 4,878,697 | 11/1989 | Henry . | |
| 5,118,141 | 6/1992 | Miyashita . | |
| 5,207,459 | 5/1993 | Glover . | |
| 5,244,237 | 9/1993 | Harvey . | |
| 5,433,487 | 7/1995 | Kuhn et al. . | |
| 5,588,682 | 12/1996 | Breese . | |
| 6,006,773 | * 12/1999 | Bravo | 285/379 |

FOREIGN PATENT DOCUMENTS

| | | | |
|---|---|---|---|
| 3539487 | * 5/1987 | (DE) | 285/192 |
| 3712309 | * 5/1988 | (DE) | 285/192 |

* cited by examiner

Primary Examiner—Teri Pham Luu
(74) Attorney, Agent, or Firm—John D. Gugliotta; Michael J. Corrigan

(57) ABSTRACT

This invention is a method and device for protecting steel gas lines and the like from environments which it may have to pass through, such as masonry and brick walls where the corrosive effects of chemicals in the cement could be disastrous. The device is composed of a an adjustable length of threaded PVC piping, a vinyl compression ring and a plastic sealing nut on each end for securing the vinyl compression ring and PVC piping around the steel piping.

6 Claims, 5 Drawing Sheets

SEALING RING/SEALING NUT

RELATED APPLICATIONS

The present invention was first described in Disclosure Document Number 458403 filed on Jun. 28, 1998. There are no previously filed, nor currently any co-pending applications, anywhere in the world.

BACKGROUND OF THE INVENTION

1. Field of the Invention

The present invention relates generally to transition conduits for protecting piping traversing through a wall and, more particularly, to an adjustable length transition conduit for protecting steel gas piping as it traverses through a wall.

2. Description of the Related Art

Various plumbing construction procedures require a variety of specialty tools and parts to provide for a professional appearing installation that meets all applicable building codes. One area that is frequently the center of attention in a plumbing inspection is the matter of steel gas piping that passes through masonry walls such as concrete block or concrete. This area is extremely important due to the possible damage that may occur to the pipe. Such damage includes collapsing of the pipe, physical damage to the pipe, and corrosion of the pipe. One method that aids in the prevention of these occurrences is a pipe sleeve. These sleeves are commonly sealed to the pipe using rubber sealing rings and steel nuts. However, the steel nuts continue to allow the pipe to corrode and rust. Accordingly, there is a need for a means by which steel gas pipes can be sealed as they pass through masonry walls in a manner which does not allow for corrosion. The development of The Sealing Ring/Sealing Nut fulfills this need.

In the related art, there exists some patents for wall penetrating conduits and sleeves. None of these patents provide an adjustable length PVC conduit which can be measured and cut on the job site for varying wall thicknesses.

A search of the prior art did not disclose any patents that read directly on the claims of the instant invention; however, the following references were considered related:

| U.S. Pat. No. | Inventor | Issue Date |
| --- | --- | --- |
| 5,207,459 | Glover | May 4, 1993 |
| 3,989,283 | Pepper | Nov. 2, 1976 |
| 5,588,682 | Breese | Dec. 31, 1996 |
| 5,433,487 | Kuhn et al. | Jul. 18, 1995 |
| 5,244,237 | Harvey | Sep. 14, 1993 |
| 5,118,141 | Miyashita | Jun. 2, 1992 |
| 4,878,697 | Henry | Nov. 7, 1989 |
| 4,699,177 | Thomas | Oct. 13, 1987 |
| 4,427,219 | Madej | Jan. 24, 1984 |

SUMMARY OF THE INVENTION

It is therefore an object of the present invention to provide an improved transition conduit for surrounding a steel pipe as it passes through a wall.

It is another object of the present invention to seal out water, bugs, rodents, and other undesirables from the area in the wall surrounding a steel pipe passing therethrough.

It is yet another object of the present invention to provide for professional installation.

It is yet still another object of the present invention to compress the nylon seal onto gas pipe.

It is another object of the present invention that it will not corrode steel pipe used as gas line.

It is an advantage of the present invention to use plastic sealing nuts instead of steel.

It is another advantage of the present invention to use a nylon seal instead of a rubber seal.

Briefly described according to one embodiment of the present invention, The Sealing Transition Conduit, as its name implies, is an improvement to an existing system of providing a sleeve system for natural gas piping passing through concrete walls. Conventional methods of sealing the sleeve piping utilize a steel nut and a rubber sealing ring. The present invention utilizes a plastic nut and a nylon sealing ring, and an adjustable length PVC conduit. This provides for not only a more secure seal against the entrance of water and/or other corroding substances, it also provides for a decrease in the corrosion of the gas line itself. The sleeve conduit is routed through the masonry wall and extends out from the wall on both sides. The gas line is routed through the conduit in a continuous manner. The nylon sealing ring and the plastic nut then center the gas line within the conduit and seals it against the entrance of any foreign matter. The use of The Sealing Ring/Sealing Nut will result in quick and professional looking installation, while providing for increased longevity of the steel gas line.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
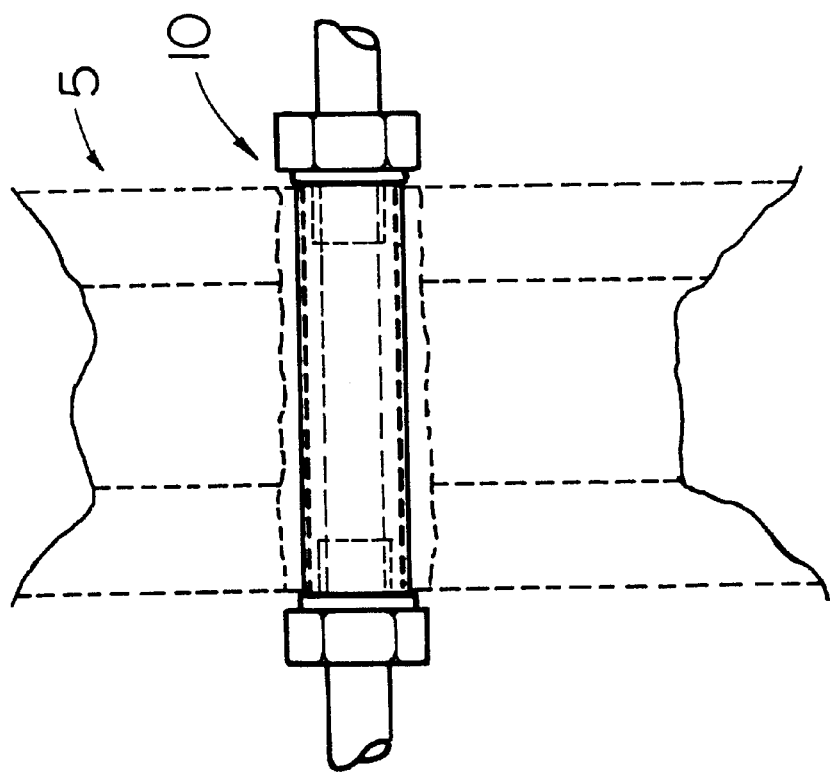
FIG. 1 is a side view of the Sealing Transition Conduit passing through a section of wall, according to the preferred embodiment of the present invention.

Referring now to FIG. 1, a Sealing Transition Conduit 10 is shown, according to the present invention, installed in a wall 5. A section of conventional steel gas pipe 6 passes through the center of the device. It is envisioned that the device would have application in both residential and commercial applications where the steel gas piping must penetrate the wall. The device would be installed while the wall is being built in new construction or a hole may be drilled for installation in existing structures. The current practice is to install the gas piping into the structure after the exterior walls are constructed. A hole is drilled and the piping is inserted. Packing is then inserted into the gap between the piping sidewalls and the wall of the structure to seal out the elements. This practice has several drawbacks. First, in time the packing can loosen and the sealing effect can be lost. Second, it is not very aesthetically pleasing and can be an eyesore. Third, piping inserted through wall is directly exposed to materials composing the wall. As such, piping exposed to masonry walls such as brick or block can suffer corrosion from the chemicals in the cement and the bricks or blocks. The present invention completely seals the gas piping within its interior not only sealing the structure from the exterior but sealing the steel piping within.

The device consists essentially of a PVC conduit 15 having a first end and a second end, and is threaded internally to receive one end from a plurality of two male couplings 20. Male coupling 20 has a first end and a second end, and is threaded externally at both ends and separated in the middle by an annular flange 20a. The first end of one of the male couplings 20 is screwed all the way into the first end of conduit 15 up the flange located around the center of the male coupling 20. After slipping the gas piping through the PVC conduit 15, a vinyl compression ring and a sealing ring 30 are then slipped over the gas piping. The sealing ring is screwed onto the second end of the male coupling 20 with the vinyl compression ring 25 sandwiched between said male coupling 20 and said sealing ring 30. As the sealing ring 30 is tightened, the compression ring 25 is compressed against the gas piping passing therethrough. The second male coupling 20, an additional compression ring 25, and an additional sealing ring 30 is included for the second end of the PVC conduit 15 located on the opposite side of the wall. In this fashion, both ends of PVC conduit 15 are sealed tight with the steel piping passing air and watertight therethrough.

Figure 2:
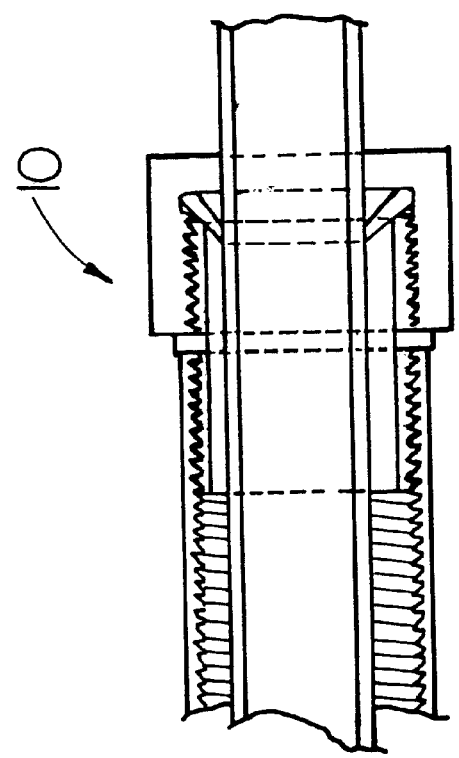
FIG. 2 is a partial cutaway side view of one end of the Sealing Transition Conduit, according to the preferred embodiment of the present invention.

Referring to FIG. 2, one end of the device is shown with the sealing ring 30, male coupling 20, and vinyl compression ring 25 sealing the piping 6 passing therethrough. This arrangement is identical for both the inner and outer walls of the structure.

Figure 3:
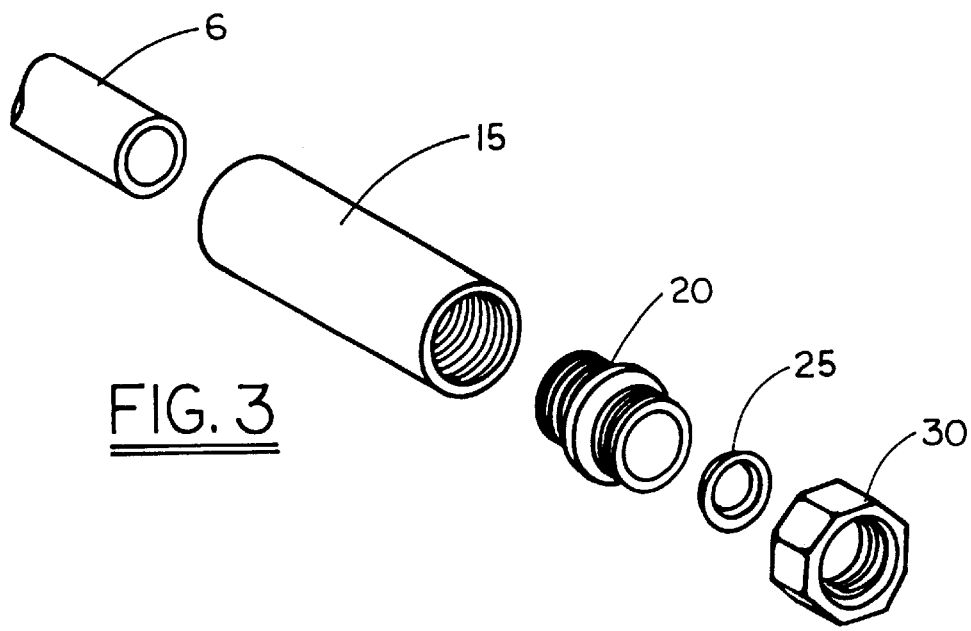
FIG. 3 is an exploded perspective view of one end of the Sealing Transition Conduit showing the components that engage the wall conduit and seal the ends, according to the preferred embodiment of the present invention.

FIG. 3 shows an exploded perspective view of one end of the device 10. As described, one end of male coupling 20 is screwed into one end of PVC conduit 15 up to the flange 20a. The steel gas piping 6 is inserted through the PVC conduit 15, the vinyl compression ring 25, and the sealing ring 30. The sealing ring 30 is then screwed onto the other end of male coupling 20 and tightened. As the sealing ring 30 is tightened, the vinyl compression ring 25 is compressed forming an airtight and watertight seal around the steel gas piping 6.

Figure 4:
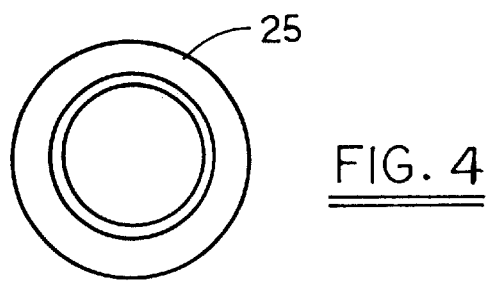
FIG. 4 is a top view of a vinyl compression ring from a Sealing Transition Conduit, according to the preferred embodiment of the present invention.
Figure 5:
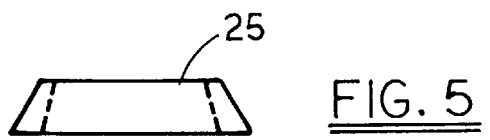
FIG. 5 is a side view of a vinyl compression ring from a Sealing Transition Conduit, according to the preferred embodiment of the present invention.
Figures 6, 7:
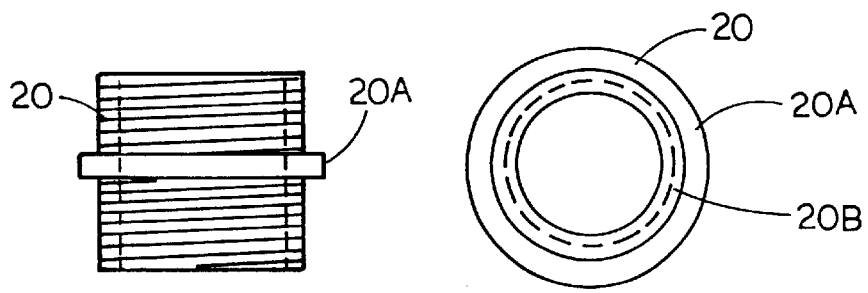
FIG. 6 is a side view of a coupling from a Sealing Transition Conduit, according to the preferred embodiment of the present invention.
FIG. 7 is a top view of a coupling from a Sealing Transition Conduit, according to the preferred embodiment of the present invention.
Figure 8:
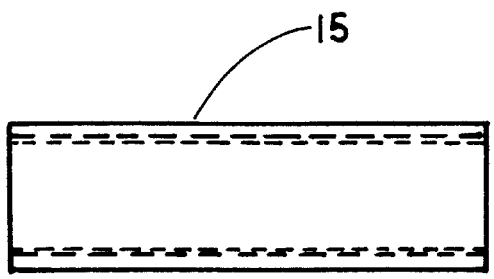
FIG. 8 is a side view of the threaded conduit from a Sealing Transition Conduit, according to the preferred embodiment of the present invention.

FIGS. 4 and 5 show various views of vinyl compression ring 25. Vinyl compression ring 25 is typical of those found with PVC type fittings. FIGS. 7 and 8 show various views of male coupling 20. An annular flange 20a is located around male coupling 20 exactly in the middle. Both ends of male coupling 20 are threaded to match the threads inside of PVC conduit 15.

Figure 9:
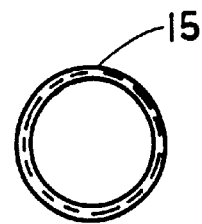
FIG. 9 is an end view of a Sealing Transition Conduit, according to the preferred embodiment of the present invention.
Figure 10:
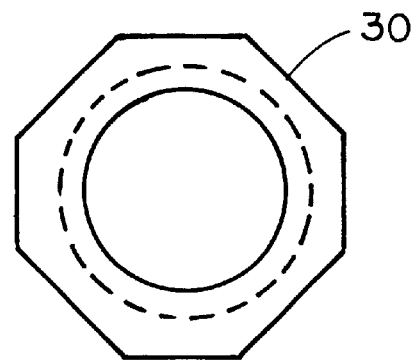
FIG. 10 is a top view of a sealing ring from a Sealing Transition Conduit, according to the preferred embodiment of the present invention.
Figure 11:
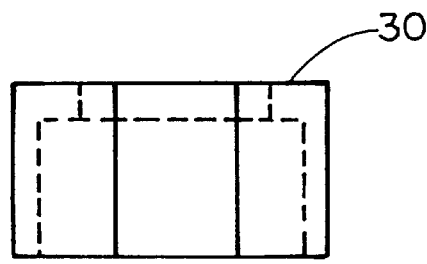
FIG. 11 is a side view of a sealing ring from a Sealing Transition Conduit, according to the preferred embodiment of the present invention.

FIGS. 8 and 9 show various views of PVC conduit 15. PVC conduit 15 is threaded internally its entire length for receiving one end of male coupling 20. PVC conduit 15's length can be adjusted by cutting with a saw at the job site for the specific application. The outer and inner diameter of PVC conduit 15 can be varied according to the diameter of the steel gas piping 6. Similarly, many different diameters of male coupling 20, vinyl compression ring 25, and sealing ring 30 would be made available for the varying sizes of conventional steel gas piping. Finally, in FIGS. 10 and 11, sealing ring 30 is shown. Sealing ring 30 is hex shaped, made of PVC and threaded internally for seating on one end of the male coupling. Generally, sealing ring 30 can be hand tightened but may be tightened additionally with a wrench fitted to the hex shaped sides.

Figure 12:
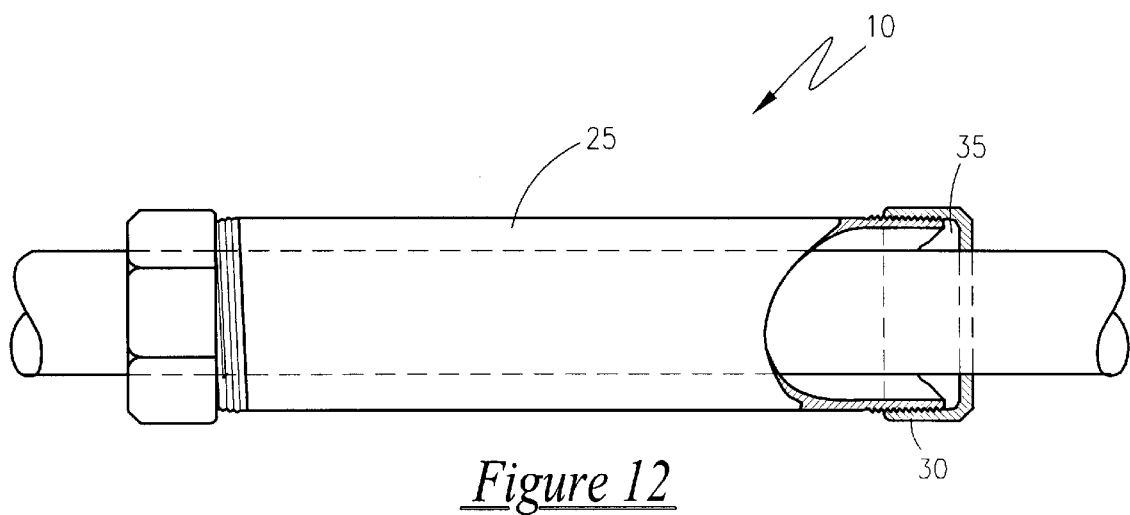
FIG. 12 is a side view of a first alternate embodiment of the present invention; and Referring finally to FIG. 12–13, an alternate embodiment is shown wherein a is a cross sectional side view thereof.
Figure 13:
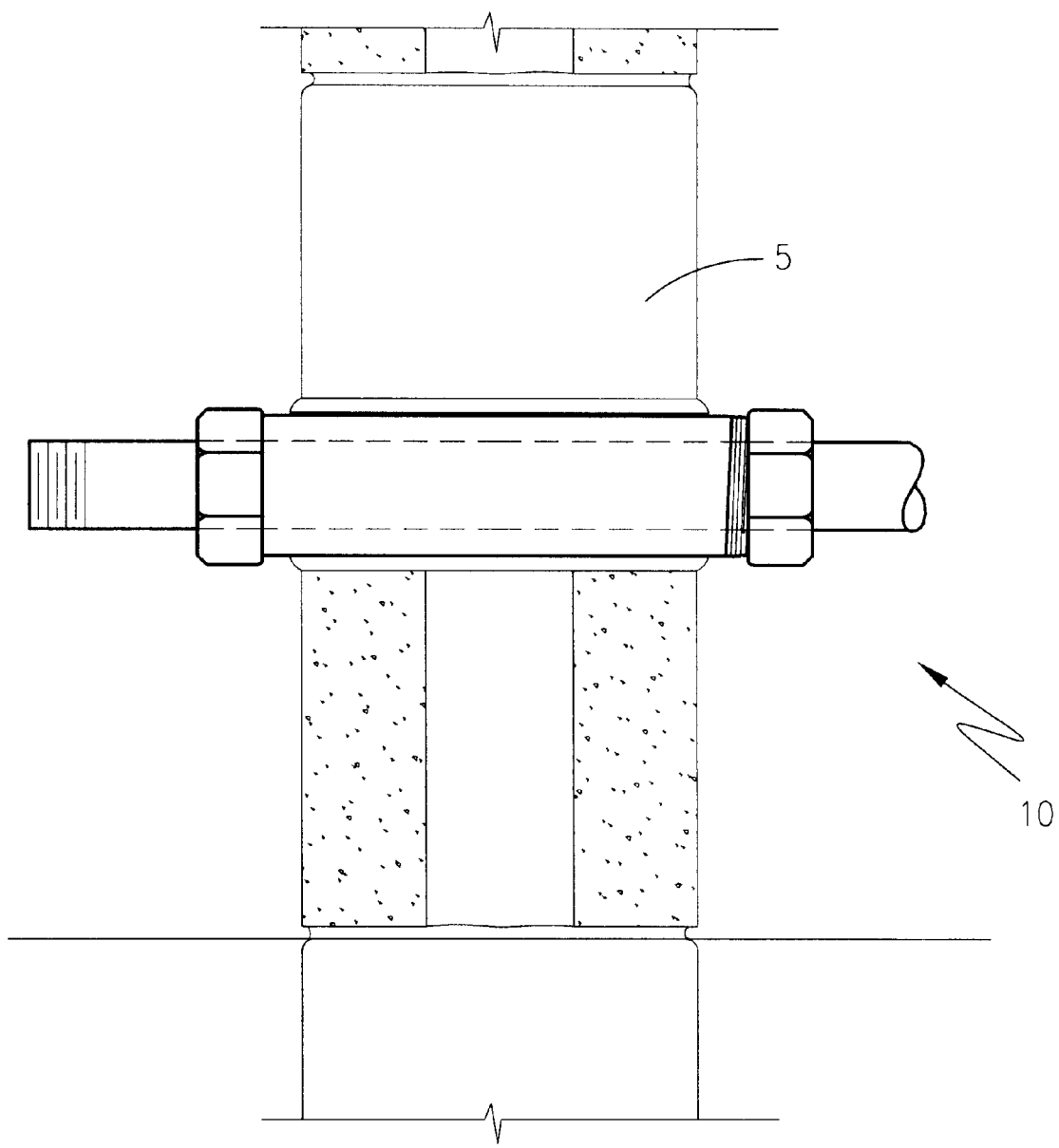

Referring now to FIG. 12--13, an alternate embodiment for a Sealing Transition Conduit 10 is shown, installed in a wall 5. Shown herein as a threaded plastic sleeve, a section of conventional steel gas pipe 6 passes through the center of the device. The device consists essentially of a PVC conduit 25 threaded externally to receive one end of a female coupling 30. The coupling 30 is screwed all the way into the conduit 25 up the flange located around the center of the coupling 30. A vinyl compression ring 35 is then screwed onto the end of the conduit 25, with the compression ring 35 being compressed against the gas piping passing therethrough. . In this fashion, both ends of PVC conduit 15 are sealed tight with the steel piping passing air and watertight therethrough using fewer components.

2. Operation of the Preferred Embodiment

In operation, the PVC conduit is cut to length and fitted into a hole formed through a wall of a structure. A piece of steel gas piping is then inserted through the PVC conduit. Then a male coupling, vinyl compression ring, and a sealing ring are slid over the pipe. One end of the male coupling is threaded into the PVC conduit. Next, the sealing ring is threaded over the other end of the male coupling, compressing the vinyl compression ring and sealing the PVC conduit. The entire process is repeated on the opposite side of the wall on the opposite end of the steel as piping. Once this operation is complete, the exterior end of the steel gas piping can be connected to the natural gas supply. The interior end of the steel gas piping is connected to the gas piping in the structure.

The foregoing description is included to illustrate the operation of the preferred embodiment and is not meant to limit the scope of the invention. The scope of the invention is to be limited only by the following claims.

What is claimed is:

1. A transition conduit for protecting piping as it traverses a wall, said transition conduit comprising:

a PVC conduit, said PVC conduit having a first end and a second end, and is threaded internally;

two male couplings, wherein said two male coupling each having a first end and a second end which are threaded externally and separated in the middle by an annular flange;

a compression ring; and a sealing ring, said sealing ring is hex shaped, made of PVC and threaded internally for seating on one end of one of said male couplings.

2. The transition conduit for protecting piping as it traverses a wall of claim 1, wherein a first end of one of said male couplings is screwed all the way into said first end of said PVC conduit up to said flange located around the middle of said male coupling.

3. The transition conduit for protecting piping as it traverses a wall of claim 2, wherein steel gas piping is slipped through said conduit followed by said compression ring, and said sealing ring and wherein said sealing ring is screwed onto a second end of said male coupling with said compression ring sandwiched between said male coupling and said sealing ring.

4. The transition conduit for protecting piping as it traverses a wall of claim 3, wherein as said sealing ring is tightened, said compression ring is compressed against the gas piping passing therethrough.

5. The transition conduit for protecting piping as it traverses a wall of claim 4, wherein a second of said male couplings, an additional compression ring, and an additional sealing ring is included for the second end of said PVC conduit located on the opposite side of the wall so both ends of said PVC conduit are sealed tight with the steel gas piping passing air and watertight therethrough.

6. The transition conduit for protecting piping as it traverses a wall of claim 5, wherein the outer and inner diameter of said PVC conduit are adapted to fit the diameter of the steel gas piping.

* * * * *